United States Patent [19]

Honda et al.

[11] Patent Number: 5,646,211

[45] Date of Patent: Jul. 8, 1997

[54] AUTODEPOSITION COATING COMPOSITION

[75] Inventors: Takumi Honda; Kazuhisa Naito, both of Kanagawa-ken, Japan

[73] Assignee: Henkel Corporation, Plymouth Meeting, Pa.

[21] Appl. No.: 634,132

[22] Filed: Apr. 19, 1996

Related U.S. Application Data

[63] Continuation of Ser. No. 284,404, filed as PCT/US93/00137, Jan. 15, 1993, abandoned.

[30] Foreign Application Priority Data

Jan. 31, 1992 [JP] Japan .................... 4-040571

[51] Int. Cl.$^6$ ........................................ C08K 3/10
[52] U.S. Cl. .................... 524/406; 524/413; 524/435; 524/377
[58] Field of Search ........................ 524/406, 413, 524/435, 377

[56] References Cited

U.S. PATENT DOCUMENTS

| | | | |
|---|---|---|---|
| 4,239,672 | 12/1980 | Zima et al. | 524/549 |
| 4,476,271 | 10/1984 | Kano et al. | 524/377 |

FOREIGN PATENT DOCUMENTS

| | | |
|---|---|---|
| 0005158 | 11/1979 | European Pat. Off. . |
| 0046268 | 2/1982 | European Pat. Off. . |
| 0312648 | 7/1984 | European Pat. Off. . |
| 1467151 | 3/1977 | United Kingdom . |

*Primary Examiner*—Paul R. Michl
*Assistant Examiner*—John J. Guarriello
*Attorney, Agent, or Firm*—Wayne C. Jaeschke; Norvell E. Wisdom, Jr.; Beatrice N. Robbins

[57] ABSTRACT

An aqueous autodeposition coating composition that is essentially free of chromium compounds and which produces a film with a much better adherence and corrosion resistance than heretofore obtained, but which does so without a rinse treatment with a chromium-containing solution prior to film curing. The aqueous autodeposition coating composition has a pH of about 1.6 to about 5 and contains (i) water-dispersible or water-soluble organic film-forming resin;
(ii) at least one of fluoride ions and flouride ions and complex fluoride ions;
(iii) ions of at least one metal selected from zinc, cobalt, manganese, nickel, iron, and aluminum; and
(iv) tungstate ion and/or molybdate ion.

19 Claims, No Drawings

AUTODEPOSITION COATING COMPOSITION

This is a continuation of application Ser. No. 08/284,404 filed as PCT/US93/00137, Jan. 15, 1993, now abandoned.

FIELD OF THE INVENTION

The invention relates to an aqueous autodeposition coating composition in the form of an acidic coating composition (pH approximately 1.6 to 5) that contains a water-dispersible or water-soluble organic film-forming resin; fluoride ions or fluoride ions and complex fluoride ions; one or more ions selected from ions of the following metals: zinc, cobalt, manganese, nickel, iron, and aluminum; and tungstate ion and/or molybdate ion. The aqueous autodeposition coating composition is capable of forming a highly corrosion-resistant, strongly adherent resin film on metal surfaces when brought into contact with the surface of a metal, for example, a ferriferous metal, zinciferous metal, aluminiferous metal, magnesium-based metal, and the like.

RELATED ART

Autodeposition coating compositions are acidic coating compositions that contain an organic film-forming resin and form a resin film on a metal surface when brought into contact with the metal surface. Autodeposition coating compositions are disclosed in, for example, Japanese Patent Publication Number Sho 47-17630 [17,630/1972],
Japanese Patent Publication Number Sho 48-14412 [14,412/1973],
Japanese Patent Publication Number Sho 52-21006 [21,006/1977],
Japanese Patent Publication Number Sho 52-35692 [35,692/1977],
Japanese Patent Publication Number Sho 53-15093 [15,093/1978],
Japanese Patent Publication Number Sho 53-44949 [44,949/1978],
Japanese Patent Application Laid Open [Kokai or Unexamined] Number Sho 60-58474 [58,474/1985],
Japanese Patent Application Laid Open Number Sho 61-168673 [168,673/1986], and
Japanese Patent Application Laid Open Number Sho 61-246267 [246,267/1986].

A characteristic feature of the known coating compositions is their ability to lay down a resin film upon immersion of a clean metal surface in the particular coating composition. Moreover, the coating film's thickness and weight increase with immersion time. In the case of these compositions, the chemical activity of the coating composition overlying the metal surface (metal ion eluted from the metal surface by etching induces association of the resin particles with resulting deposition on the metal surface) results in the efficient deposition of a resin film on the metal surface without the application, as in electrodeposition, of an external electrical source.

One example of a metal ion-containing coating composition is disclosed in Japanese Patent Publication Number Sho 52-35692. This publication discloses the use of a composition that contains a ferric ion-supplying iron compound to coat ferriferous metal. A coating composition that contains various metal ions (not including the ferric ion) is disclosed in Japanese Patent Publication Number Sho 53-44949 for the coating of various types of metal substrates. However, the demands made on coating performance have recently become more severe, particularly with regard to adherence and corrosion resistance. As disclosed in U.S. Pat. No. 3,647,567, U.S. Pat. No. 4,030,945, Japanese Patent Publication Number Sho 53-15093, and Japanese Patent Application Laid Open Number Sho 61-168673, a rinse treatment with a chromium-containing solution or aqueous alkali solution, etc. (post-treatment directly after autodeposition) may be implemented prior to film curing (prior to baking/drying) in order thereby to provide the ultimately produced film with better corrosion resistance and better adherence. In this case, the presence of a chromium compound is particularly effective for enhancing film performance and particularly the corrosion resistance provided by the film.

However, environmental considerations provide a strong incentive against the use of chromium compounds, for example, a chromium rinse, and of late there has been strong demand for the use of chromium-free coating compositions for the coating of metals and the like. In addition, the ability to provide a film with excellent adherence and corrosion resistance with fewer process steps (contraction) has also become an important consideration. All in all, it is an important problem to improve the adherence and corrosion resistance of the final coating without using chromium compounds. Nevertheless, films generated by prior chromium-free coating compositions have not been fully satisfactory in their critical properties (high adherence, high corrosion resistance).

BRIEF DESCRIPTION OF THE INVENTION

The present invention provides an essentially chromium compound-free film which has much better adherence and corrosion resistance than the films formed by prior-art coating compositions, but which is produced without a rinse treatment (for example, with a chromium-containing solution) prior to film curing.

The aqueous autodeposition coating composition of the invention has a pH of about 1.6 to about 5 and contains (i) water-dispersible or water-soluble organic film-forming resin;
(ii) at least one of fluoride ions or fluoride ions and complex fluoride ions;
(iii) additional metal ions of at least one metal selected from the group consisting of zinc, cobalt, manganese, nickel, iron, and aluminum; and
(iv) at least one of tungstate ion and molybdate ion.

A highly adherent, strongly corrosion-resistant resin film is formed on the metal surface when the aqueous autodeposition coating composition of the present invention is brought into contact with a metal surface, for example, the surface of ferriferous, zinciferous, aluminiferous, or magnesium-based metal.

The composition of the invention provides films with a better adherence and corrosion resistance than the films afforded by prior autodeposition coating compositions due to an acidic coating composition (pH about 1.6 to about 5) that contains organic film-forming resin; fluoride ion or fluoride ion and complex fluoride ion; one or more additional metal ions selected from the group consisting of zinc, cobalt, manganese, nickel, iron, and aluminum; and also tungstate ion and/or molybdate ion.

In addition, the present invention provides a highly adherent, highly corrosion-resistant film without having to carry out a post-treatment (precure rinse treatment, for example, with a chromium-containing solution) that have heretofore been implemented for the purpose of improving the adherence and corrosion resistance of the films produced by autodepositing coating compositions.

DETAILED DESCRIPTION OF THE INVENTION

Resin of the type disclosed in Japanese Patent Application Sho 61-168673 is an example of resin highly suitable for use as the organic film-forming resin in the present invention.

The organic film-forming resin useful in the practice of the present invention is exemplified by the following: urethane resins, epoxy resins, polyester resins, and polymer resins composed of one or more monomers selected from methyl acrylate, ethyl acrylate, n-butyl acrylate, 2-hydroxyethyl acrylate, 2-hydroxypropyl acrylate, 2-ethylhexyl acrylate, methyl methacrylate, ethyl methacrylate, n-butyl methacrylate, 2-hydroxyethyl methacrylate, 2-hydroxypropyl methacrylate, glycidyl acrylate, glycidyl methacrylate, acrylamide, methacrylamide, acrylonitrile, ethylene, styrene, vinyl chloride, vinylidene chloride, vinyl acetate, acrylic acid, methacrylic acid, and the like.

The organic film-forming resin useful in the practice of the invention may be anionic, cationic, nonionic, or amphoteric and is not specifically restricted in this regard. The content of resin solids in the coating composition preferably falls within the range of 5 to 550 g/L and more preferably falls within the range of 50 to 100 g/L.

Sources for the fluoride ion and complex fluoride ion useful in the practice of the invention are, for example, zirconium hydrogen fluoride, titanium hydrogen fluoride, silicon hydrogen fluoride, boron hydrogen fluoride, hydrofluoric acid, and the ammonium, lithium, sodium, and potassium salts of the preceding acids. The content of fluoride or fluoride ion and complex fluoride ion in the coating composition preferably falls within the range of 0.1 to 5 g/L as fluorine and more preferably falls within the range of 0.5 to 3 g/L as fluorine.

The pH of the coating composition of the invention should be maintained within the range of about 1.6 to about 5. Formation of the resin film becomes problematic when the pH is substantially outside this range. The pH of the coating composition may be regulated using one or more acids selected from inorganic acids such as the acids listed above as sources of fluoride and complex fluoride ion and their salts, as well as nitric acid, phosphoric acid, and boric acid; and organic acids selected from phytic acid and tannic acid. The addition of nitric acid, phosphoric acid, boric acid, phytic acid, or tannic acid has the effect of improving film adherence to the substrate.

The zinc, cobalt, manganese, nickel, iron, and aluminum metal ions useful in the practice of the invention (hereinafter additional metal ions) can be supplied using the carbonates, nitrates, phosphates, sulfates hydroxides, oxides, and chlorides of the corresponding metals. The metal ion is taken into the resin film during film formation (deposition process), and it functions as a crosslinker for the resin during the heating carried out during film drying and curing. The metal ion bonds with the functional groups in the resin to bring about a substantial increase in the molecular weight of the resin and thereby improve the corrosion resistance of the film formed on the metal. The additional metal ions are present in solution in the composition in the range of from about 0.1 to about 20 gram/liter preferably from about 0.2 to about 10 grams/liter and more preferably from about 0.3 to about 6 grams/liter.

A critical feature of the present invention is the additional presence of at least one of tungstate ion and molybate ion in a coating composition that contains organic film-forming resin; fluoride and/or complex fluoride ion; and one or more ions selected from the ions of the following metals: zinc, cobalt, manganese, nickel, iron, and aluminum.

Applicant will not be bound by theory but Applicant's theory is that the tungstate ion and/or molybdate ion present in the aqueous autodeposition coating composition of the invention forms a complex with a portion of the aforementioned metal ions. The metal (ion) in the complex appears to substitute for metal ion eluted from the surface of the metal workplace, which results in efficient deposition onto the surface of the metal workplace and ultimately coverage of the metal surface together with the organic film-forming resin.

In the case of the prior-art chromium rinses, the chromium (ion) taken into the resin film is largely present relatively near the surface of the resin film. In contrast to this, due to the presence of tungstate ion and/or molybdate ion in the coating composition, the metal ion taken into the resin film is largely present not only within the resin film, but also in particular in the vicinity of the metal surface of the substrate to a much greater degree than for prior-art coating compositions. This results in the production of a film having excellent adherence and corrosion resistance.

The tungstate ion used in the present invention can be supplied in the form of tungstic acid, sodium tungstate, calcium tungstate, potassium tungstate, and the like. The molybdate ion used in the present invention can be supplied in the form of molybdic acid, sodium molybdate, calcium molybdate, potassium molybdate, and the like. The content of tungstate ion and molybdate ion in the coating composition should be 0.1 to 5 g/L and is preferably 0.3 to 2 g/L.

The coating composition of the present invention may also contain an oxidant as an optional material. In addition, the coating composition of the present invention can contain pigment to impart color to the film.

Examples of the present invention and comparison examples are presented below.

COMPOSITION PRODUCTION EXAMPLES A THROUGH O

Aqueous coating compositions were prepared using an acrylic emulsion (41.5% solids, Rhoplex WL-91 from the Rohm & Haas Company) and the other components as reported in Table 1 (brought to a total of 1 L with de-ionized water).

Examples 1 Through 16

The aqueous coating compositions prepared in Composition Production Examples A through P were used in these examples. The aqueous coating composition baths were held at approximately 20° C. to 22° C. Preliminarily cleaned cold-rolled steel sheet, galvannealed hot-dipped zinc-plated steel sheet, electrogalvanized steel sheet, or aluminum sheet (size=70×150×1 mm in all cases) was treated in the particular example by immersion for 180 seconds. After a water rinse, the sample was dried in an oven for 20 minutes at 180° C. and was then submitted to the various tests. The results of the performance testing of the test sheets are reported in Table 2.

Comparison Examples 1 through 3

The aqueous coating composition prepared in Composition Production Example Q was used in the comparison examples. The aqueous coating composition baths were held at approximately 20° C. to 22° C. Preliminarily cleaned cold-rolled steel sheet, galvannealed hot-dipped zinc-plated steel sheet, or electrogalvanized steel sheet (size=70×150×1 mm in all cases) were treated by immersion for 180 seconds. After a water rinse, the sample was dried in an oven for 20 minutes at 180° C. and was then submitted to the various tests. The results of the performance testing of the test sheets are reported in Table 2.

Comparison Example 4

The aqueous coating composition prepared in Composition Production Example Q was used in this comparison example. The aqueous coating composition bath was held at approximately 20° C. to 22° C. Preliminarily cleaned cold-rolled steel sheet (size=70×150×1 mm) was treated by immersion for 180 seconds. After a water rinse, the sample was immersed in an aqueous chromium-containing solution (Palene 60, trademark of Nihon Parkerizing Company, Limited) for 60 seconds at room temperature and then dried in an oven for 20 minutes at 180° C. The sample was subsequently submitted to the various tests, and the results of the performance testing of the test sheet are reported in Table 2.

Test Methods and Evaluation Standards

1. Film Adherence (checkerboard adhesive tape peeling test)

A grid of one hundred 1×mm×1 mm squares was cut in the test sheet and peeled with adhesive tape, and the number of remaining film squares was counted. This test was conducted both before and after immersion in water at 40° C. for 240 hours. The pre-immersion results are reported in row a and the post-immersion results are reported in row b. 2. Film Adherence (Dupont impact test)

A 1 kg impacter (diameter=½ inch) was dropped on the test sheet and the impact area was peeled with adhesive tape. The value measured was the highest impacter drop-height at which film peeling did not occur. This test was conducted both before and after immersion in water at 40° C. for 240 hours. The pre-immersion results are reported in row a and the post-immersion results are reported in row b. 3. Corrosion Resistance The test sheet was prepared by cutting a cross in the coating to reach the base metal, and the test sheet was then subjected to salt-spray testing in accordance with JIS Z-2371 (500 hours for the cold-rolled steel sheet, galvannealed hot-dipped zinc-plated steel sheet, and electrogalvanized steel sheet and 1,000 hours for the aluminum sheet). The test sheet was subsequently subjected to tape peeling, and the peel width from the cross cut (one side, mm) was measured.

The aqueous autodeposition coating composition of the present invention is environmentally advantageous because it does not contain chromium. Moreover, coatings with a much better adherence and corrosion resistance than the coatings obtained from prior-art coating compositions are formed by contacting metal surfaces with the aqueous autodeposition coating composition of the present invention. Furthermore, this is achieved without having to carry out a rinse treatment, for example, with a chromium-containing solution, prior to film curing.

TABLE I

| Components In The Aqueous Coating Composition (g/L) | | | | | |
| --- | --- | --- | --- | --- | --- |
| Produciton Example No. | | A | B | C | D |
| RESIN (solids) | | 50 | 50 | 100 | 80 |
| $Zn^{2+}$ | (as zinc) | | | | |
| $Co^{2+}$ | (as cobalt) | | | | |
| $Mn^{2+}$ | (as manganese) | | 0.50 | | |
| $Ni^{2+}$ | (as nickel) | | | 1.00 | |
| $Fe^{2+}$ | (as iron) | | | | 0.90 |
| $Fe^{3+}$ | (as iron) | 1.50 | | | 3.00 |
| $Al^{3+}$ | (as aluminum) | | | | |
| FLUORIDE OR COMPLEX FLUORIDE | | | | | |
| hydrogen fluoride | (as F) | 1.20 | 1.20 | 1.60 | 2.70 |
| boron hydrogen fluoride | (as F) | | | | 0.51 |
| lithium borofluoride | (as F) | | | | |
| zirconium hydrogen fluoride | (as F) | | | | |
| potassium fluozirconate | (as F) | | | | |
| titanium ammonium fluoride | (as F) | | | 0.20 | |
| sodium silicofluoride | (as F) | | | | |
| INORGANIC ACIDS | | | | | |
| nitric acid | | | 0.30 | | |
| phosphoric acid | | | | | |
| boric acid | | 0.40 | 0.60 | | |
| ORGANIC ACIDS | | | | | |
| phytic acid | | | | | |
| tannic acid | | | | | |
| TUNGSTEN AND MOLYBDENUM COMPOUNDS | | | | | |
| tungstic acid | (as $WO_4$) | | | | |
| Na tungstate | (as $WO_4$) | 0.65 | 0.60 | 0.60 | 0.80 |
| Ca tungstate | (as $WO_4$) | | | | |
| K tungstate | (as $WO_4$) | | | | |
| molybdic acid | (as $MoO_4$) | | | | |
| Na molybdate | (as $MoO_4$) | | | | |
| Ca molybdate | (as $MoO_4$) | | | | |
| K molybdate | (as $MoO_4$) | | | | |
| ADDITIVES | | | | | |
| oxidant | (hydrogen peroxide) | | | | |
| black pigment | (solids) | 1.40 | 1.40 | | |
| pH | | 3.2 | 3.3 | 3.4 | 3.6 |

| Production Example No. | | E | F | G | H |
| --- | --- | --- | --- | --- | --- |
| RESIN (solids) | | 50 | 50 | 200 | 50 |
| $Zn^{2+}$ | (as zinc) | | 0.50 | | 0.60 |
| $Co^{2+}$ | (as cobalt) | | | | |
| $Mn^{2+}$ | (as manganese) | | | 1.00 | |
| $Ni^{2+}$ | (as nickel) | | | 0.45 | 0.45 |
| $Fe^{2+}$ | (as iron) | | 0.40 | | |
| $Fe^{3+}$ | (as iron) | | | | |
| $Al^{3+}$ | (as aluminum) | 0.45 | | | |
| FLUORIDE OR COMPLEX FLUORIDE | | | | | |
| hydrogen fluoride | (as F) | 2.50 | 0.50 | 1.00 | 1.00 |
| boron hydrogen fluoride | (as F) | | | | |
| lithium borofluoride | (as F) | 0.16 | | | |
| zirconium hydrogen fluoride | (as F) | | | 0.60 | |
| potassium fluozirconate | (as F) | | | 0.25 | |
| titanium ammonium fluoride | (as F) | | | | |
| sodium silicofluoride | (as F) | | | | 0.40 |
| INORGANIC ACIDS | | | | | |
| nitric acid | | | | | 0.40 |
| phosphoric acid | | | | | |
| boric acid | | | 0.80 | | 0.20 |
| ORGANIC ACIDS | | | | | |
| phytic acid | | | | | |
| tannic acid | | | | | |
| TUNGSTEN AND MOLYBDENUM COMPOUNDS | | | | | |
| tungstic acid | (as $WO_4$) | | | | 0.32 |

TABLE I-continued

Components In The Aqueous Coating Composition (g/L)

| | | | | | |
|---|---|---|---|---|---|
| Na tungstate | (as WO₄) | 0.60 | | | |
| Ca tungstate | (as WO₄) | | 0.66 | | |
| K tungstate | (as WO₄) | | | | |
| molybdic acid | (as MoO₄) | | | | 0.33 |
| Na molybdate | (as MoO₄) | 0.54 | | | |
| Ca molybdate | (as MoO₄) | | | | |
| K molybdate | (as MoO₄) | | | | |
| ADDITIVES | | | | | |
| oxidant | (hydrogen peroxide) | | | | |
| black pigment | (solids) | | | | |
| pH | | 3.5 | 2.9 | 3.3 | 3.4 |

| Production Example No. | | I | J | K | L |
|---|---|---|---|---|---|
| RESIN (solids) | | 50 | 50 | 50 | 50 |
| Zn²⁺ | (as zinc) | | | | 0.80 |
| Co²⁺ | (as cobalt) | 0.60 | | 0.45 | 0.45 |
| Mn²⁺ | (as manganese) | | | | |
| Ni²⁺ | (as nickel) | | 0.70 | 0.80 | |
| Fe²⁺ | (as iron) | | | | |
| Fe³⁺ | (as iron) | 0.30 | 0.30 | 0.25 | 0.25 |
| Al³⁺ | (as aluminum) | | | | |
| FLUORIDE OR COMPLEX FLUORIDE | | | | | |
| hydrogen fluoride | (as F) | 1.00 | 1.00 | 1.00 | 1.00 |
| boron hydrogen fluoride | (as F) | | | | |
| lithium borofluoride | (as F) | | | | |
| zirconium hydrogen fluoride | (as F) | | | | |
| potassium fluozirconate | (as F) | | | | |
| titanium ammonium fluoride | (as F) | | | | |
| sodium silicofluoride | (as F) | | | | |
| INORGANIC ACIDS | | | | | |
| nitric acid | | 0.50 | 0.50 | 0.40 | 0.40 |
| phosphoric acid | | | | | |
| boric acid | | 0.20 | 0.20 | 0.20 | 0.20 |
| ORGANIC ACIDS | | | | | |
| phytic acid | | | | | |
| tannic acid | | | | | |
| TUNGSTEN AND MOLYBDENUM COMPOUNDS | | | | | |
| tungstic acid | (as WO₄) | | | | |
| Na tungstate | (as WO₄) | 0.32 | 0.32 | | |
| Ca tungstate | (as WO₄) | | | | 0.33 |
| K tungstate | (as WO₄) | 0.10 | | | 0.20 |
| molybdic acid | (as MoO₄) | | | | |
| Na molybdate | (as MoO₄) | | | | |
| Ca molybdate | (as MoO₄) | | | 0.40 | |
| K molybdate | (as MoO₄) | | | 0.10 | 0.31 |
| ADDITIVES | | | | | |
| oxidant | (hydrogen peroxide) | | | | 0.30 |
| black pigment | (solids) | | | | |
| pH | | 3.5 | 3.6 | 3.4 | 3.3 |

| Production Example No. | | M | N | O | P |
|---|---|---|---|---|---|
| RESIN (solids) | | 80 | 50 | 100 | 100 |
| Zn²⁺ | (as zinc) | 0.60 | | 0.50 | |
| Co²⁺ | (as cobalt) | | | | |
| Mn²⁺ | (as manganese) | | 0.25 | | |
| Ni²⁺ | (as nickel) | | 1.00 | | |
| Fe²⁺ | (as iron) | | | | |
| Fe³⁺ | (as iron) | | | | 0.50 |
| Al³⁺ | (as aluminum) | | | | |
| FLUORIDE OR COMPLEX FLUORIDE | | | | | |
| hydrogen fluoride | (as F) | 1.20 | 0.65 | 1.50 | 1.80 |
| boron hydrogen fluoride | (as F) | | | | |
| lithium borofluoride | (as F) | | | | |
| zirconium hydrogen fluoride | (as F) | | | | |
| potassium fluozirconate | (as F) | | | | |
| titanium ammonium fluoride | (as F) | | | | |
| sodium silicofluoride | (as F) | | | | |
| INORGANIC ACIDS | | | | | |
| nitric acid | | 0.30 | | 0.35 | 0.35 |
| phosphoric acid | | 1.45 | 1.00 | | |
| boric acid | | | | 0.40 | 0.40 |
| ORGANIC ACIDS | | | | | |
| phytic acid | | | | 0.24 | |
| tannic acid | | | | | 0.40 |
| TUNGSTEN AND MOLYBDENUM COMPOUNDS | | | | | |
| tungstic acid | (as WO₄) | | | | |
| Na tungstate | (as WO₄) | 0.39 | 0.60 | 0.60 | 0.60 |
| Ca tungstate | (as WO₄) | | | | |
| K tungstate | (as WO₄) | | | | |
| molybdic acid | (as MoO₄) | | | | |
| Na molybdate | (as MoO₄) | | | | |
| Ca molybdate | (as MoO₄) | | | | |
| K molybdate | (as MoO₄) | | | | |
| ADDITIVES | | | | | |
| oxidant | (hydrogen peroxide) | 0.50 | | | |
| black pigment | (solids) | | | | 0.50 |
| pH | | 3.0 | 3.1 | 3.3 | 3.5 |

| Production Example No. | | Q |
|---|---|---|
| RESIN (solids) | | 50 |
| Zn²⁺ | (as zinc) | |
| Co²⁺ | (as cobalt) | |
| Mn²⁺ | (as manganese) | |
| Ni²⁺ | (as nickel) | |
| Fe²⁺ | (as iron) | |
| Fe³⁺ | (as iron) | 1.50 |
| Al³⁺ | (as aluminum) | |
| FLUORIDE OR COMPLEX FLUORIDE | | |
| hydrogen fluoride | (as F) | 1.20 |
| boron hydrogen fluoride | (as F) | |
| lithium borofluoride | (as F) | |
| zirconium hydrogen fluoride | (as F) | |
| potassium fluozirconate | (as F) | |
| titanium ammonium fluoride | (as F) | |
| sodium silicofluoride | (as F) | |
| INORGANIC ACIDS | | |
| nitric acid | | |
| phosphoric acid | | |
| boric acid | | |
| ORGANIC ACIDS | | |
| phytic acid | | |
| tannic acid | | |
| TUNGSTEN AND MOLYBDENUM COMPOUNDS | | |
| tungstic acid | (as WO₄) | |
| Na tungstate | (as WO₄) | |
| Ca tungstate | (as WO₄) | |
| K tungstate | (as WO₄) | |
| molybdic acid | (as MoO₄) | |
| Na molybdate | (as MoO₄) | |
| Ca molybdate | (as MoO₄) | |
| K molybdate | (as MoO₄) | |

TABLE 1-continued

Components In The Aqueous Coating Composition (g/L)

ADDITIVES

| | |
|---|---|
| oxidant | (hydrogen peroxide) |
| black pigment | (solids) 1.40 |
| pH | 3.3 |

TABLE 2

| | Example | | | | | |
|---|---|---|---|---|---|---|
| | 1 | 2 | 3 | 4 | 5 | 6 |
| Composition Production Number | A | B | C | D | E | F |
| COATING SUBSTRATE | | | | | | |
| cold-rolled steel sheet | + | | + | + | | + |
| galvannealed hot-dipped zinc-plated steel sheet | | | | | | |
| electrogalvanized steel sheet | | | | | | |
| aluminum sheet | | + | | | + | |
| Chromium Rinse Treatment | | | | | | |
| Coating Add-on (g/m²) | 20 | 15 | 20 | 18 | 13 | 15 |
| Metal Add-on (mg/m²)* | 205 | 156 | 195 | 220 | 200 | 162 |
| Cr Add-on (mg/m²) | | | | | | |
| COATING PROPERTIES | | | | | | |
| Adherence (checkerboard peeling) | | | | | | |
| a | 100 | 100 | 100 | 100 | 100 | 100 |
| b | 100 | 100 | 100 | 100 | 100 | 100 |
| Adherence (Dupont impact) | | | | | | |
| a | 40 | 40 | 40 | 40 | 40 | 40 |
| b | 30 | 40 | 30 | 40 | 40 | 30 |
| Corrosion Resistance | 1.0 | 0.5 | 1.5 | 1.5 | 1.0 | 2.0 |

| | Example | | | | | |
|---|---|---|---|---|---|---|
| | 7 | 8 | 9 | 10 | 11 | 12 |
| Composition Production Number | G | H | I | J | K | L |
| COATING SUBSTRATE | | | | | | |
| cold-rolled steel sheet | | | | | | |
| galvannealed hot-dipped zinc-plated steel sheet | | | + | | | + |
| electrogalvanized steel sheet | | | | + | | |
| aluminum sheet | + | + | | | | + |
| Chromium Rinse Treatment | | | | | | |
| Coating Add-on (g/m²) | 17 | 15 | 14 | 15 | 13 | 12 |
| Metal Add-on (mg/m²)* | 138 | 125 | 155 | 140 | 135 | 120 |
| Cr Add-on (mg/m²) | | | | | | |
| COATING PROPERTIES | | | | | | |
| Adherence (checkerboard peeling) | | | | | | |
| a | 100 | 100 | 100 | 100 | 100 | 100 |
| b | 100 | 100 | 100 | 100 | 100 | 100 |
| Adherence (Dupont impact) | | | | | | |
| a | 40 | 40 | 40 | 40 | 30 | 40 |
| b | 40 | 30 | 30 | 40 | 30 | 30 |
| Corrosion Resistance | 0 | 0 | 1.5 | 1.5 | 1.5 | 0.5 |

TABLE 2-continued

| | Example | | | |
|---|---|---|---|---|
| | 13 | 14 | 15 | 16 |
| Composition Production Number | M | N | O | P |
| COATING SUBSTRATE | | | | |
| cold-rolled steel sheet | + | | | |
| galvannealed hot-dipped zinc-plated steel sheet | | | | |
| electrogalvanized steel sheet | | | + | |
| aluminum sheet | | + | | + |
| Chromium Rinse Treatment | | | | |
| Coating Add-on (g/m²) | 16 | 12 | 14 | 20 |
| Metal Add-on (mg/m²) | 180 | 140 | 160 | 205 |
| Cr Add-on (mg/m²) | | | | |
| COATING PROPERTIES | | | | |
| Adherence (checkerboard peeling) | | | | |
| a | 100 | 100 | 100 | 100 |
| b | 100 | 100 | 100 | 100 |
| Adherence (Dupont impact) | | | | |
| a | 40 | 40 | 40 | 40 |
| b | 30 | 30 | 40 | 40 |
| Corrosion Resistance | 1.5 | 0.5 | 0 | 1.0 |

*total add-on of metal(s) present in the composition

We claim:

1. An aqueous autodeposition coating composition having a pH in the range of about 1.6 to about 5.0 which comprises:
   a) water dispersible or water-soluble organic film forming resin;
   b) at least one of fluoride ion or fluoride ion and complex fluoride ion;
   c) additional metal ions of at least one metal selected from the group consisting of zinc, cobalt, manganese, nickel, iron and aluminum;
   d) at least one of tungstate ion and molybdate ion; and
   e) water, wherein said aqueous autodeposition coating composition is essentially chromium-free.

2. An aqueous autodeposition coating composition of claim 1 containing an amount of at least one acid selected from the group consisting of nitric acid, phosphoric acid, boric acid, phytic acid and tannic acid needed to thereby maintain said pH of the composition in said range.

3. An autodeposition coating composition of claim 1 wherein the organic film forming resin comprises at least one film forming resin selected from the group consisting of urethane resin, epoxy resin, and polyester resin.

4. An autodeposition coating composition of claim 1 containing from 5 to 550 grams/liter of film forming resin.

5. An autodeposition coating composition of claim 2 containing from 5 to 550 grams/liter of film forming resin.

6. An autodeposition coating composition of claim 1 containing an amount of fluoride ion or fluoride ion and complex fluoride ion which amount provides a fluorine content that falls within the range of from 0.1 to 5 grams per liter.

7. An autodeposition coating composition of claim 1 containing 0.1 to 20 grams/liter of additional metal ions.

8. An autodeposition coating composition of claim 1 containing from 0.1 to 5 grams/liter of at least one of tungstate ion and molybdate ion.

9. An autodeposition coating composition of claim 1 which comprises:

a) 5 to 550 grams/liter of the water soluble or water dispersible film forming resin;
b) an amount of fluoride ion or fluoride ion and complex fluoride ion which amount provides a fluorine content that falls within the range of from 0.1 to 5 grams/liter;
c) 0.1 to 20 grams/liter of said additional metal ions; and
d) 0.1 to 5 grams/liter of said at least one of tungstate ion and molybdate ion.

10. An autodeposition coating of claim 2 comprising:
a) 5 to 550 grams/liter of the water soluble or water dispersible film forming resin;
b) an amount of fluoride ion or fluoride ion and complex fluoride ion which amount provides a fluorine content that falls within the range of from 0.1 to 5 grams/liter;
c) 0.1 to 20 grams/liter of said additional metal ions; and
d) 0.1 to 5 grams/liter of said at least one of tungstate ion and molybdate ion.

11. An autodeposition coating of claim 3 which comprises:
a) 5 to 550 grams/liter of the water soluble or water dispersible film forming resin;
b) an amount of fluoride ion or fluoride ion and complex fluoride ion which amount provides a fluorine content that falls within the range of from 0.1 to 5 grams/liter;
c) 0.1 to 20 grams/liter of said additional metal ions; and
d) 0.1 to 5 grams/liter of said at least one of tungstate ion and molybdate ion.

12. An autodeposition coating of claim 9 wherein the organic film forming resin is present at from 50 to 100 grams/liter.

13. An autodeposition coating of claim 9 containing an amount of fluoride ion or fluoride ion and complex fluoride ion which amount provides a fluorine content that falls within the range of from 0.5 to 3 grams/liter.

14. A composition of claim 9 containing from 0.3 to 6 grams per liter of additional metal ions.

15. A composition of claim 11 containing an amount of fluoride ion or fluoride ion and complex fluoride ion which amount provides a fluorine content that falls within the range of from 0.5 to 3 grams/liter.

16. A composition of claim 9 which comprises:
a) 50 to 100 grams/liter organic film forming resin;
b) an amount of fluoride ion or fluoride ion and complex fluoride ion which amount provides a fluorine content that falls within the range of from 0.5 to 3 grams/liter;
c) 0.3 to 6 grams/liter of said additional metal ions; and
d) 0.3 to 2 grams/liter of said at least one of tungstate ion and molybdate ion.

17. A composition of claim 16 wherein the organic film forming resin comprises at least one film forming resin selected from the group consisting of urethane resin, epoxy resin, and polyester resin.

18. Autodepositing coating composition of claim 1 wherein the organic film forming resin is a polymer resin composed of one or more monomers selected from the group consisting of methyl acrylate, ethyl acrylate, butyl acrylate, 2-hydroxy ethyl acrylate, 2-hydroxypropyl acrylate, 2-ethylhexyl acrylate, methyl methacrylate, ethyl methacrylate, n-butyl methacrylate, 2-hydroxyethyl methacrylate, 2-hydroxypropyl methacrylate, glycidyl acrylate, glycidyl methacrylate, acrylamide, methacrylamide, ethylene, styrene, vinyl chloride, vinylidene chloride, vinyl acetate, acrylic acid and methacrylic acid.

19. A composition of claim 16 wherein the organic film forming resin is a polymer resin composed of one or more monomers selected from the group consisting of methyl acrylate, ethyl acrylate, butyl acrylate, 2-hydroxy ethyl acrylate, 2-hydroxypropyl acrylate, 2-ethylhexyl acrylate, methyl methacrylate, ethyl methacrylate, n-butyl methacrylate, 2-hydroxyethyl methacrylate, 2-hydroxypropyl methacrylate, glycidyl acrylate, glycidyl methacrylate, acrylamide, methacrylamide, ethylene, styrene, vinyl chloride, vinylidene chloride, vinyl acetate, acrylic acid and methacrylic acid.

* * * * *